United States Patent
Fuse et al.

(10) Patent No.: US 11,255,719 B2
(45) Date of Patent: Feb. 22, 2022

(54) MATERIAL PROPERTY INSPECTION APPARATUS

(71) Applicant: ANRITSU CORPORATION, Kanagawa (JP)

(72) Inventors: Masaaki Fuse, Kanagawa (JP); Ken Shioiri, Kanagawa (JP); Takao Tanimoto, Kanagawa (JP); Hideyuki Sakamoto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 317 days.

(21) Appl. No.: 16/662,688

(22) Filed: Oct. 24, 2019

(65) Prior Publication Data

US 2020/0158565 A1    May 21, 2020

(30) Foreign Application Priority Data

Nov. 15, 2018   (JP) .............................. JP2018-214832

(51) Int. Cl.
  *G01J 1/02*    (2006.01)
  *G01J 1/04*    (2006.01)

(52) U.S. Cl.
  CPC ........... *G01J 1/0238* (2013.01); *G01J 1/0407* (2013.01)

(58) Field of Classification Search
  CPC .... G01J 1/0238; G01N 21/93; G01N 21/9508
  See application file for complete search history.

(56) References Cited

U.S. PATENT DOCUMENTS

| 2009/0062581 A1 | 3/2009 | Appel et al. |
| 2011/0194113 A1* | 8/2011 | Sakai ..................... G01B 11/06 356/432 |
| 2017/0307512 A1 | 10/2017 | Akagawa et al. |

FOREIGN PATENT DOCUMENTS

| JP | H04-344444 A | 12/1992 |
| JP | H07-198602 A | 8/1995 |
| JP | H08-285768 A | 11/1996 |
| JP | H11-133022 A | 5/1999 |
| JP | 2000-131220 A | 5/2000 |
| JP | 2003-083887 A | 3/2003 |
| JP | 2003-285043 A | 10/2003 |
| JP | 2009-229140 A | 10/2009 |
| JP | 2011-515509 A | 5/2011 |
| JP | 2012-052998 A | 3/2012 |
| JP | 2012-184950 A | 9/2012 |
| JP | 2014-025720 A | 2/2014 |
| WO | 2016-063547 A1 | 4/2016 |

* cited by examiner

*Primary Examiner* — Thanh Luu
(74) *Attorney, Agent, or Firm* — Pearne & Gordon LLP (57) ABSTRACT

A material property inspection apparatus includes a conveyance unit, a light source, an irradiation unit, a light receiving unit, a signal detection unit, a material property value input unit, an inspection set value input unit, and a processing unit. The processing unit calculates a relation equation between the material property value from the material property values of the plurality of test pieces and the light intensity of the transmitted light or the reflected light of respective test pieces, calculates the material property value of the inspected object from the light intensity of the transmitted light or the reflected light detected by the signal detection unit and the relation equation, compares the calculated material property value of the inspected object with the inspection set value inputted from the inspection set value input unit, and determines the quality of the inspected object.

19 Claims, 5 Drawing Sheets

MATERIAL PROPERTY INSPECTION APPARATUS

CROSS REFERENCE TO RELATED APPLICATIONS

This application claims Convention priority to Japanese Patent Application No. 2018-214832, filed Nov. 15, 2018, the entire contents of which are incorporated herein by reference.

FIELD OF THE INVENTION

The present invention relates to a material property inspection apparatus for inspecting material properties which inspects the content of any material contained in food, medicine, and the like, and the material properties such as density, tableting pressure, porosity.

BACKGROUND ART

Conventionally, as a method of quantitatively analyzing samples such as food and medicine, there are known: an infrared absorption spectrum analysis (infrared spectroscopy) which irradiates infrared rays to the sample and measures the absorption due to the natural vibration of the molecule (infrared spectroscopy); a chromatographic analysis to separate materials into individual components using differences in the size adsorption power, charge, mass, hydrophobicity, and the like of the material; a nuclear magnetic resonance absorption analysis in which energy transition of atomic nucleus is measured as absorption of electromagnetic energy added to the sample in a strong magnetic field, and simultaneously, chemical shift caused by difference of diamagnetism due to electrons around nucleus is used to investigate properties such as molecular structure and motion state; a mass spectrometry that ionizes a sample with a high energy source such as an electron beam or X-ray and measures the amount of ions for each mass number using an electromagnetic field; and the like.

However, all of the above-described methods are large-scale in the configuration of the apparatus and expensive. In addition, infrared absorption spectrum analysis (infrared spectroscopy) uses a projector and a spectrometer that emits broadband infrared light, and among the methods described above, the apparatus is relatively small and inexpensive, but when measuring an object having a poor transmittance is to be inspected, it is necessary to irradiate the inspected object with high-power broadband infrared rays, and irradiation of high-power broadband infrared rays may sometimes even damage the inspected object. In addition, it takes time for measurement, since the absorption spectrum is measured.

However, in the inspection in the manufacturing process of tablets and the like, nondestructive and high-speed measurement is required without damaging the inspected object.

Incidentally, a component content estimation method by the near-infrared spectroscopy analysis as disclosed by Patent Document 1 shown below is conventionally known as a technique to estimate the component content contained in food. The invention of Patent Document 1 is characterized in that a term composed of the amount of absorption of the wavelength of the negative or positive inverse property is used in obtaining the calibration curve, when the temperature dependency of the term composed of the dominant wavelength is positive or negative, in a component content estimation method in which a sample content of a known component is irradiated with near-infrared light of the wavelength of a region that absorbs a predetermined component to measure an absorbance, then the absorbance is calculated and used as an explanatory variable, and the content of the predetermined component of the sample is used as a target variable for regression analysis, thereby to obtain a calibration curve, so that the content of the predetermined component of the sample whose component content is unknown is estimated by the calibration curve.

Here, an absorbance A at wavelength $\lambda$ can be obtained by the formula $A=-\log_{10}(I/Ii)$, taking the common logarithm of the ratio (transmittance) of the light intensity Ii of incident light to the light intensity I of transmitted light.

CITATION LIST

Patent Literature

[Patent Document 1] Japanese Patent Application Publication No. H7-198602

SUMMARY OF THE INVENTION

Technical Problem

However, there is such a problem that, where measurement of the absorbance A requires measurement of the light intensity Ii of the incident light and the light intensity I of the transmitted light, respectively, in the case that a high-loss inspected object is inspected, the ratio of light intensity Ii of incident light and the light intensity I of the transmitted light is large, so that the measurement becomes difficult, which requires an expensive measurement system to realize the measurement.

Therefore, the present invention has been made in view of the above problems, and it is the objective of the present invention to provide a small-sized and inexpensive material property inspection apparatus capable of inspecting the inspected object, less likely to damage the inspected object, with a short time of measurement.

Means to Solve the Problem

In order to achieve the above objective, the material property inspection apparatus according to the present invention comprises: a conveyance unit 2 that conveys an inspected object W;

a light source 3 that generates light including specific wavelength determined by a material property of the inspected object;

an irradiation unit 4 that irradiates the light to the inspected object conveyed by the conveyance unit;

a light receiving unit 5 that receives transmitted light or reflected light of the inspected object;

a signal detection unit 6 that detects light intensity of the transmitted light or the reflected light from an output signal of the light receiving unit;

a material property value input unit 7 that inputs material property values of a plurality of test pieces with known material property value;

an inspection set value input unit 8 that inputs an inspection set value for determination of quality of the inspected object; and a processing unit 9 that determines the material property value of the inspected object from the light intensity of the transmitted light or the reflected light detected by the signal detection unit, wherein the processing unit calculates a relation equation between the material property value from the material property values of the plurality of test pieces inputted in the material property value input unit and the light intensity of the transmitted light or the reflected light of respective test pieces detected by the signal detection unit, calculates the material property value of the inspected object from the light intensity of the transmitted light or the reflected light detected by the signal detection unit and the relation equation, compares the calculated material property value of the inspected object with the inspection set value inputted from the inspection set value input unit, and determines the quality of the inspected object.

The material property inspection apparatus according to the present invention may be so configured that, a light chopper 12 that modulates the light irradiated to the inspected object with a constant cycle is further provided, and the signal detection unit 6 performs synchronous detection in a lock-in amplifier system using a reference signal synchronized with a modulated light modulated by the light chopper.

The material property inspection apparatus according to the present invention may be so configured that, a determination range for determination of the quality of the inspected object W is set automatically, from the inspection set value and a statistical data obtained at the time of calculating the relation equation.

In the material property inspection apparatus according to the present invention, the material property value input unit 7 may select one material property from a plurality of material properties, and may input a known material property value of the test piece with respect to the selected material property.

In the material property inspection apparatus according to the present invention, the material property value may be linear data, and the light intensity may be logarithmic data.

Effect of the Invention

According to the present invention, by using test pieces whose material property value are known, but the absorbance thereof are unknown, it is possible to provide a small-sized and inexpensive material property inspection apparatus capable of inspecting material properties (content, density, tableting pressure, porosity, and the like) of the inspected material, less likely to damage the inspected object, with a short time of measurement.

DETAILED DESCRIPTION OF THE INVENTION

Hereinafter, embodiments of the present invention will be described in detail with reference to the attached drawings.

SUMMARY OF THE INVENTION

The present invention is a material property inspection apparatus for inspecting material properties such as content, density, tableting pressure, porosity of any material contained in food, medicine and the like.

In the present invention, when inspecting the material property, the light intensity of the transmitted light (or reflected light) is measured instead of the absorbance as disclosed in Patent Document 1, and the light intensity of the transmitted light (or reflected light) is used to calculate (estimate) the material property values. However, the light intensity measurement of the transmitted light (or reflected light) is a relative value measurement in which the measured value varies depending on various conditions (for example, variation in light intensity of the irradiation light). For this reason, in the present invention, by using measured values using known test pieces as material property values to be calculated (estimated) in advance, an inspection in which the influence of variation in measured values under various conditions is suppressed is realized.

[About the Configuration of the Material Property Inspection Apparatus]

Figure 1:
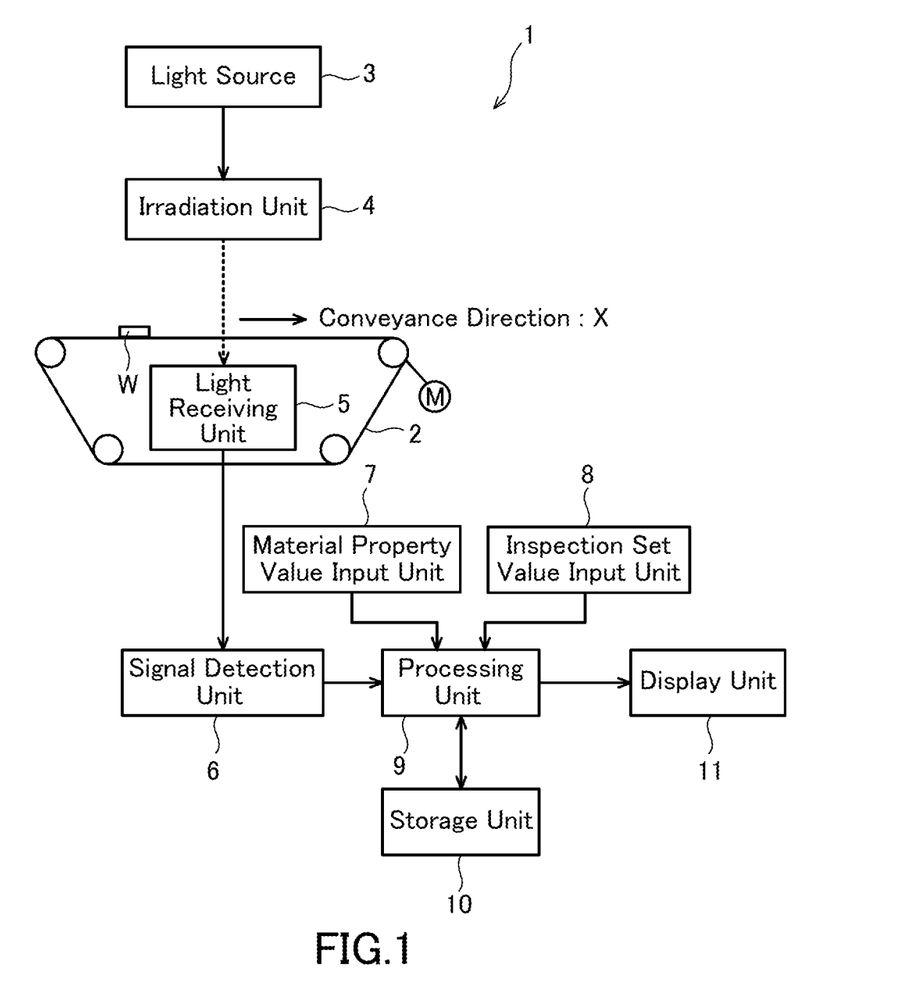
FIG. 1 is a block diagram of a material property inspection apparatus according to the present invention.

As shown in FIG. 1, the material property inspection apparatus 1 (1A) includes a conveyance unit 2, a light source 3, an irradiation unit 4, a light receiving unit 5, a signal detection unit 6, a material property value input unit 7, and an inspection set value input unit 8, a processing unit 9, a storage unit 10, and a display unit 11.

The conveyance unit 2 sequentially conveys the inspected object W at a predetermined interval on the conveyance path, and is constituted by, for example, a belt conveyor disposed horizontally with respect to the apparatus main body.

When the inspection of the inspected object W is performed on the belt conveyor 2 as the conveyance unit, the conveyance belt for conveying the inspected object W is driven and controlled at a predetermined conveyance speed. Thereby, the inspected object W is conveyed on the belt conveyor 2 at a predetermined interval in a conveyance direction X in FIG. 1.

Here, when the light receiving unit 5 receives the transmitted light from the inspected object W, the conveyor belt of the belt conveyor 2 is constituted by a light transparency belt so that the light irradiated from the light source 3 through the irradiating unit 4 is transmitted.

The light source 3 outputs light of a wavelength at which the light intensity of the transmitted light or the reflected light of the inspected object W varies according to an arbitrary material property of the inspected object W. This means that the light intensity of the transmitted light or the reflected light of the inspected object W varies depending on the material property of the inspected object, within a specific wavelength region determined by material property of the inspected object.

The irradiation unit 4 irradiates the light outputted from the light source 3 to the inspected object W. For example, the irradiation unit 4 propagates the light outputted from the light source 3 with an optical fiber, and collimates the light emitted from the end face of the optical fiber by the collimate lens, so that the inspected object W is irradiated with parallel light.

The light receiving unit 5 receives transmitted light or reflected light from the inspected object W accompanying irradiation of light from the irradiation unit 4 to the inspected object W.

The signal detection unit 6 detects the light intensity of the transmitted light or the reflected light from the inspected object W detected by the light reception unit 5.

The material property value input unit 7 inputs material property values of a plurality of test pieces, which is of the same type as the inspected object W and whose material property values are known. The material property value input unit 7 is adapted to select one material property from a plurality of material properties (content, density, tableting pressure, porosity, and the like) as the material property of each test piece, and input a known value on an input screen of the display unit 11.

By this configuration, an arbitrary inspection item of material properties can be selected, thereby enabling measurement and display of the inspected object W corresponding to the selected inspection item.

The inspection set value input unit 8 inputs an inspection set value for determining the quality of the inspected object W on the input screen of the display unit 11. The inspection set value is to be compared with the material property value calculated by the processing unit 9, and constitutes a judgment range value indicating the range of the material property value for judging the inspected object W as a good item.

The processing unit 9 performs processing related to the inspection of the inspected object W, calculates a relation equation between the material property value from the material property values of the plurality of test pieces inputted in the material property value input unit 7 and the light intensity of the transmitted light or the reflected light of respective test pieces detected by the signal detection unit 6 when the light from the light source 3 is irradiated to the plurality of test pieces, and stores the calculated relation equation between the material property value and the light intensity (calibration curve) and the statistical data obtained when calculating said relation equation in the storage unit 10.

Figure 2:
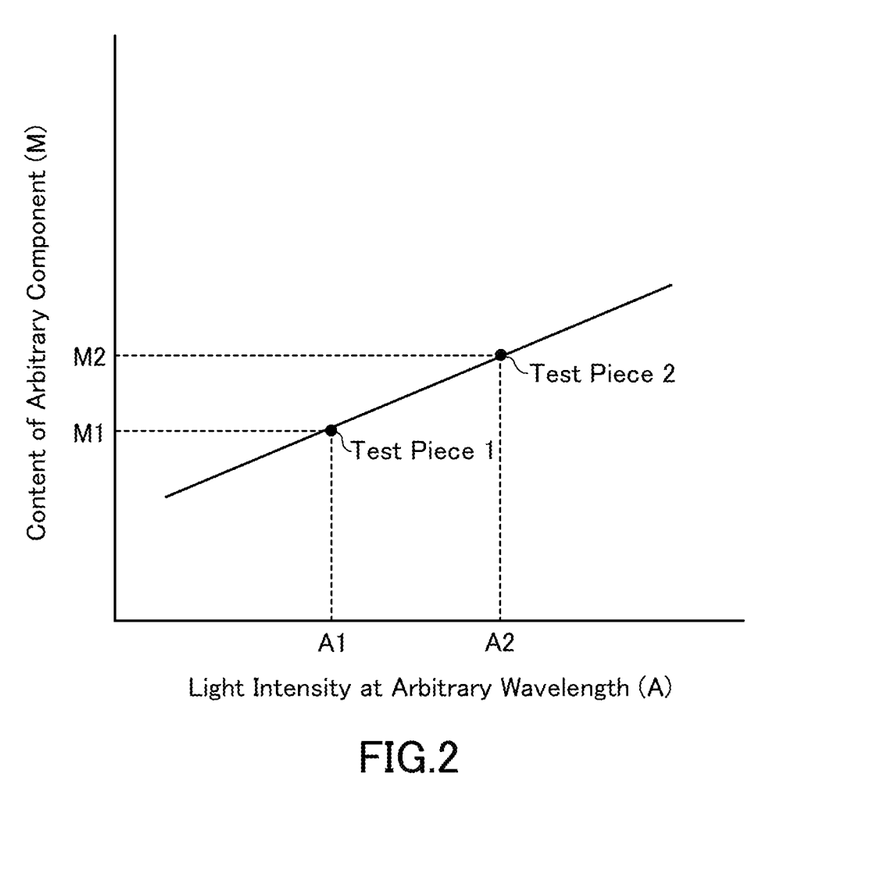
FIG. 2 is an explanatory view regarding a relation equation of a material property value and a light intensity.

Here, a method of calculating the relational equation (calibration curve) of the material property value and the light intensity will be described with reference to FIG. 2. Here, a case of measuring the light intensity of the transmitted light using two test pieces whose component content is known, where the component content is assumed as the material property, will be described as an example.

The light from the light source 3 is sequentially irradiated from the irradiation unit 4 to the two test pieces whose component content is known, and the light intensity of the transmitted light is measured, so that the relational equation between the component content and the light intensity is obtained. Here, a component property value is linear data, and the light intensity is logarithmic data.

In the case where the relationship between the component content (M [mg]) and the light intensity (A [dB]) can be expressed as $M=aA+b$ . . . Equation (1), the light intensity (absorption amount) of test piece 1 $A1=-\log(T1)$ . . . Equation (2) and the light intensity (absorption amount) of test piece 2 $A2=-\log(T2)$ . . . Equation (3), assuming that the light intensity of the transmitted light of the test piece 1 with the component content M1 detected by the signal detection unit 6 is T1 (linear value) and the light intensity of the transmitted light of the test content 2 with the component content M2 detected by the signal detection unit 6 is T2(linear value).

Further, from the above equation (1), $M1=aA1+b$ . . . Equation (4), $M2=aA2+b$ . . . Equation (5)

Based on the above, the relation equation $M=aA+b$ (the linear calibration curve shown in FIG. 2) between the component content M and the light intensity A is calculated from the light intensity of the test piece 1 and the test piece 2 (A1, A2) and the component content of the test piece 1 and the test piece 2 (M1, M2) and parameters of the calculated relation equation and the data at the time of calculating the relation equation (component content, light intensity of the transmitted light, absorption amount) are stored in the storage unit 10.

The above example described a case in which the light intensities of the transmitted light of the two test pieces having known component contents M1 and M2 are measured once, the relation equation is calculated from the light intensity of the transmitted light obtained by one measurement. However, the present invention is not limited to this case. For example, the measurement of the light intensity of the transmission intensity of two test pieces with known component contents M1 and M2 may be tried several times, the average value of the light intensity of the transmitted light obtained by the plurality of measurements may be determined, the light intensity (absorption amount) A1, A2 of the two test pieces may be determined from the average value of the light intensity of the transmitted light, and the relation equation $M=aA+b$ between the component content M and the light intensity A may be calculated from the light intensities (A1, A2) and the component contents (M1, M2) of the two test pieces. Data (component content, light intensity of transmitted light, absorption amount) at this time and statistical data (for example, average value, dispersion, etc.) calculated from them are stored in the storage unit 10.

In addition, since depending on the material property value, the calibration curve varies due to differences in the set value of the manufacturing facilities (for example, tableting pressure) and the environment (temperature, humidity), and the like, it is desirable to regularly conduct calculation of the calibration curve by test pieces and update and store the data in the storage unit 10, thereby making it possible to carry out more accurate inspections.

Further, the determination range of the inspection set value for determination of the quality of the inspected object W may be set automatically, from the inspection set value inputted from the inspection set value input unit 8 and the statistical data obtained at the time of calculating the relation equation between the material property and the light intensity.

The processing unit 9 calculates the material property value of the inspected object W from the light intensity of the transmitted light or the reflected light of the inspected object W detected by the signal detection unit 6 and the relation equation (calibration curve) between the material property value and the light intensity stored in the storage unit 10, compares the calculated material property value with the inspection set value (determination range value) inputted in the inspection set value input unit 8, and determines the quality of the inspected object. This means that, the processing unit 9 determines that the inspected object W is a good item when the calculated material property value is within the range of the determination range value, while the processing unit 9 determines that the inspected object W is a defective item when the calculated material property value is not within the range of the determination range value.

The storage unit 10 stores parameters of the relation equation (calibration curve) of the material property value calculated by the processing unit 9 and the light intensity, and statistical data at the time of calculation of the relation equation. In addition, the storage unit 10 stores various setting information related to the inspection of the object W, including the material property value inputted from the material property value input unit 7 and the inspection set value input from the inspection set value input unit 8.

The display unit 11 is constituted by, for example, a display device such as a liquid crystal display, and displays an input screen for inputting material property values from the material property value input unit 7 and inspection set values (determination range values) from the inspection set value input unit 8, a measurement inspection screen including an inspection total number of the inspected object W, and a determination result (the number of good items and the number of defective items) of the inspected object W by the processing unit 9 and the like on the display screen.

[About the Operation of the Material Property Inspection Apparatus]

Figure 3:
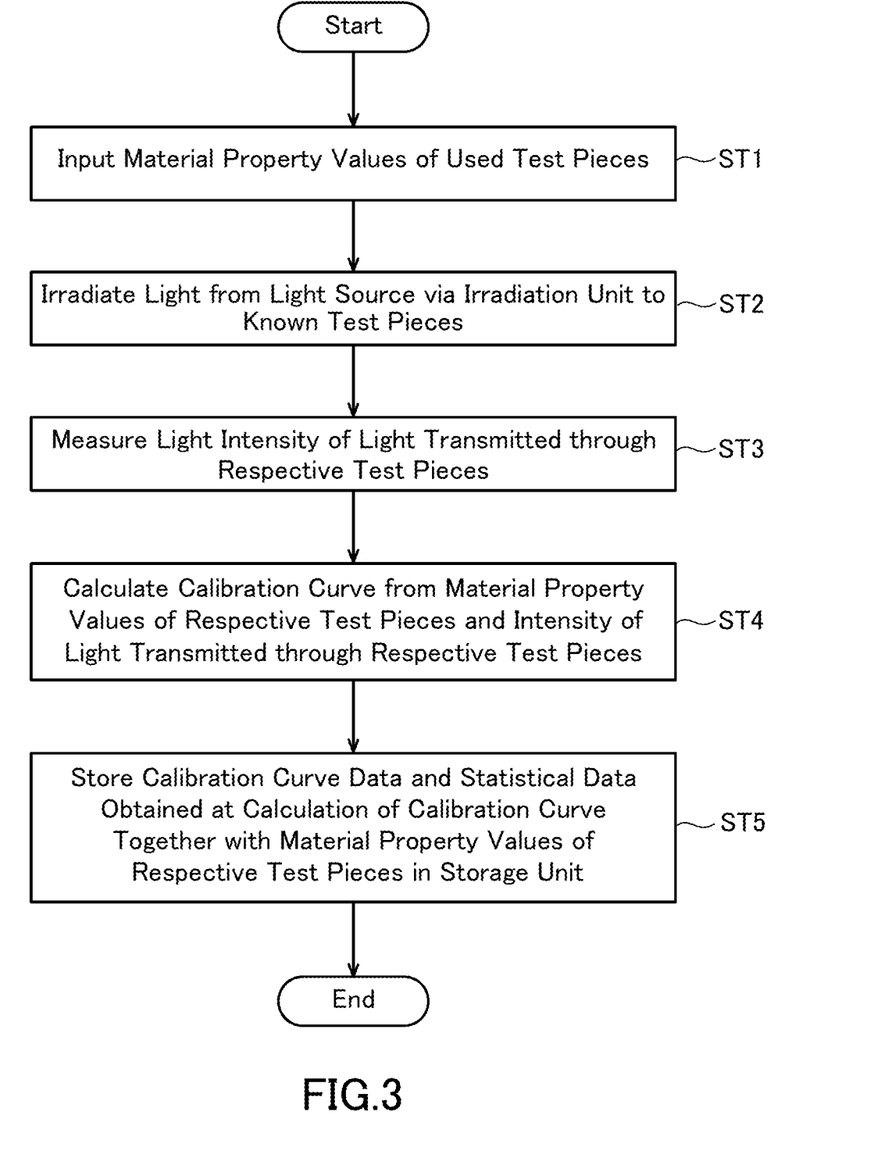
FIG. 3 is a flowchart showing a processing procedure using a test piece.
Figure 4:
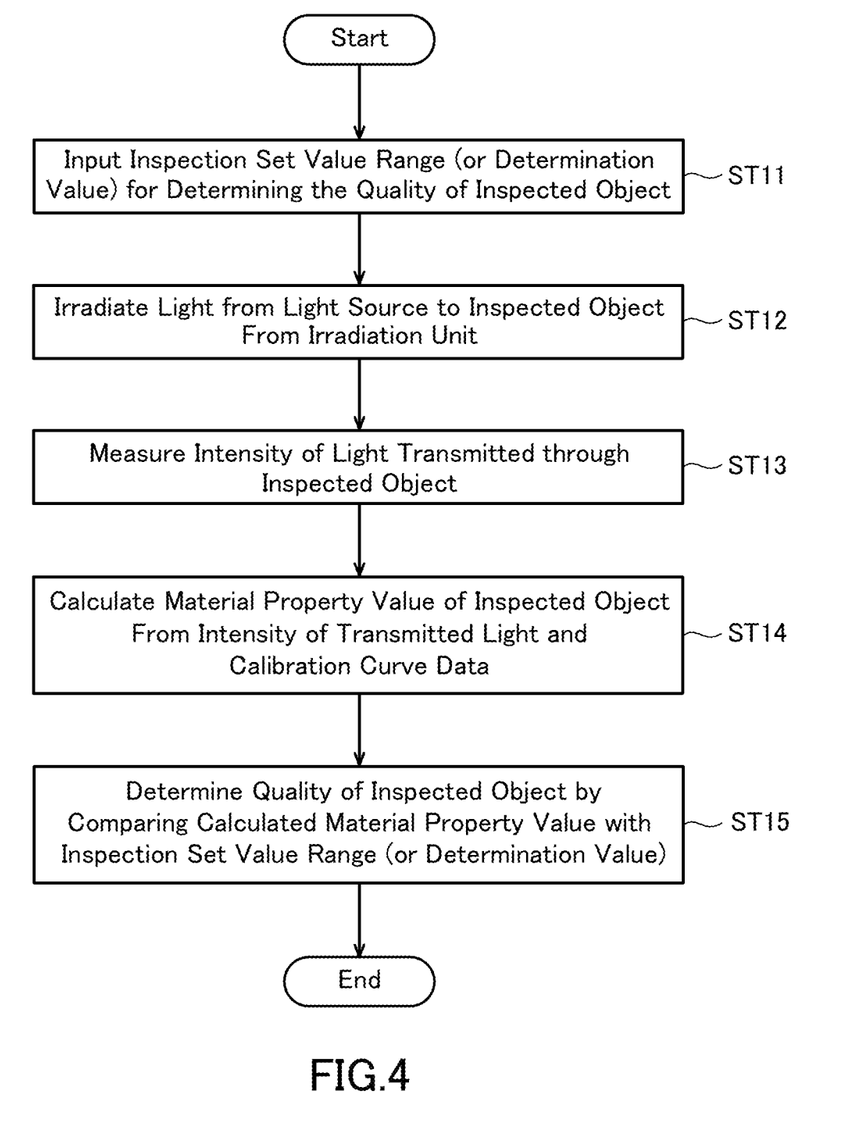
FIG. 4 is a flowchart showing a processing procedure at the time of inspection.

Next, the operation in the case of inspecting the material property of the inspected object W using the material property inspection apparatus 1 configured as described above will be described with reference to the flowcharts of FIG. 3 and FIG. 4.

First, known material property values of a plurality of test pieces to be used are inputted from the material property value input unit 7 on the input screen of the display unit 11 (ST1).

Then, a plurality of test pieces whose material property values are known are sequentially conveyed by the conveyance unit 2, and the light from the light source 3 is sequentially irradiated from the irradiation unit 4 to the plurality of test pieces (ST2). Then, the light transmitted through each test piece is received by the light receiving unit 5, and the signal detection unit 6 measures the light intensity of the transmitted light of each test piece (ST3). The light intensity of the transmitted light measured at this time is obtained as a logarithmic value.

Next, the light intensity (absorption amount) of each test piece is calculated from the material property value and the light intensity of the transmitted light in each test piece, and a calibration curve based on the relation equation between the material property value and the light intensity is calculated from the material property and the light intensity of the respective test pieces (ST4). Then, the calculated calibration curve data and the statistical data obtained at the time of calculation of the calibration curve are stored in the storage unit 10 together with the material property values of the respective test pieces (ST5).

Then, when the process described above is completed, the inspection set value (determination range value) for determining the quality of the inspected object W to be inspected is input from the inspection set value input unit 8 on the input screen of the display unit 11 (ST11).

Next, the inspected object W to be inspected is sequentially conveyed by the conveyance unit 2, and the light from the light source 3 is sequentially irradiated from the irradiation unit 4 to the inspected object W (ST12). Then, the light transmitted through the inspected object W is received by the light receiving unit 5, and the light intensity of the transmitted light is measured by the signal detection unit 6 (ST13). The light intensity of the transmitted light measured at this time is obtained as a logarithmic value.

Next, the material property value of the inspected object W is calculated from the light intensity of the transmitted light measured by the signal detection unit 6 and the calibration curve data (ST14), and the quality of the inspected object W is determined by comparing the calculated material property value of the inspected object W and the inspection set value (ST15).

Other Embodiments of Material Property Inspection Apparatus

Figure 5:
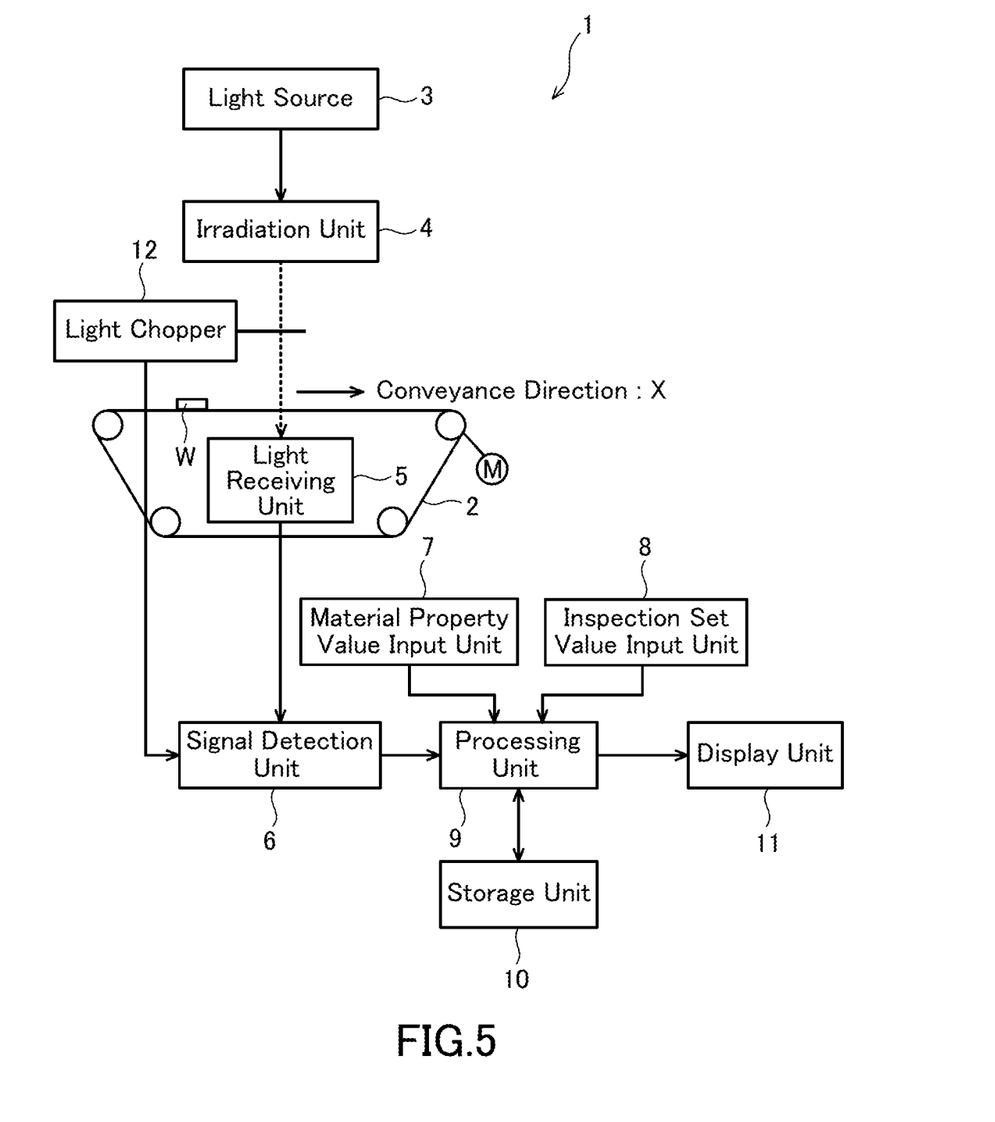
FIG. 5 is a block diagram showing another embodiment of the material property inspection apparatus according to the present invention.

Incidentally, the material property inspection apparatus according to the present invention may be so configured as shown in FIG. 5 provided with a light chopper 12, as another embodiment of the material property inspection apparatus 1 (1B). In FIG. 5, the same components as those in FIG. 1 are denoted by the same reference numerals, and the description thereof is omitted.

The light chopper 12 modulates the light irradiated to the inspected object W from the light source 3 through the irradiation unit 4 with a constant cycle.

Further, the signal detection unit 6 performs synchronous detection in a lock-in amplifier system using a reference signal synchronized with a modulated light modulated by the light chopper 12.

According to the material property inspection apparatus 1B of FIG. 5, since the modulated light obtained by adding modulation to the light irradiated to the inspected object W from the irradiation unit 4 is used as the light to be measured, the signal detection unit 6 performs synchronous detection. Unnecessary light contained in the transmitted light or the reflected light of the inspected object W is removed, so that more sensitive measurement becomes possible.

As described above, the material property inspection apparatus according to the present embodiment calculates a relation equation between the material property and the light intensity from the measurement using test pieces with known material property. Then, quality of the inspected object is determined by comparing the material property value calculated from the light intensity of the inspected object with the inspection set value (determination range value), based on the calculated relation equation between the material property value of the test piece and the light intensity.

The material property inspection apparatus according to the present embodiment is small-sized and can be realized at low cost, and is adapted to calculate the attenuation amount of the wavelength component from the light intensity of the transmitted light or the reflected light obtained when the inspected object is irradiated with light of only an arbitrary wavelength component. Therefore, it is not necessary to perform the broadband spectrum measurement, thereby making it possible to shorten the measurement time.

In addition, since light of only the required wavelength component is irradiated to the inspected object, the total irradiation light power to the inspected object can be suppressed as compared with the case of using a broadband light source, thereby making it possible to suppress any damage to the inspected object and to inspect any property value (content, density, tableting pressure, porosity, and the like) contained in food or medicine.

As mentioned above, although the best form of the material property inspection apparatus concerning the present invention has been explained, the present invention is not limited by the statement and drawing by this embodiment. This means that it is needless to say that all other embodiments, examples, operation techniques and the like made by those skilled in the art based on this embodiment are included in the scope of the present invention.

EXPLANATION OF REFERENCE NUMERALS (1A, 1B) Material Property Inspection Apparatus
2 Conveyance Unit
3 Light Source 4 Irradiation Unit
5 Light Receiving Unit
6 Signal Detection Unit
7 Material Property Value Input Unit
8 Inspection Set Value Input Unit
9 Processing Unit
10 Storage Unit
11 Display Unit
12 Light Chopper
W Inspected Object

What is claimed is:

1. A material property inspection apparatus, comprising:
a conveyance unit that conveys an inspected object;
a light source that generates light including specific wavelength determined by a material property of the inspected object;
an irradiation unit that irradiates the light to the inspected object conveyed by the conveyance unit;
a light receiving unit that receives transmitted light or reflected light of the inspected object;
a signal detection unit that detects light intensity of the transmitted light or the reflected light from an output signal of the light receiving unit;
a material property value input unit that inputs material property values of a plurality of test pieces with known material property value;
an inspection set value input unit that inputs an inspection set value for determination of quality of the inspected object; and
a processing unit that determines the material property value of the inspected object from the light intensity of the transmitted light or the reflected light detected by the signal detection unit, wherein
the processing unit calculates a relation equation between the material property value from the material property values of the plurality of test pieces inputted in the material property value input unit and the light intensity of the transmitted light or the reflected light of respective test pieces detected by the signal detection unit, calculates the material property value of the inspected object from the light intensity of the transmitted light or the reflected light detected by the signal detection unit and the relation equation, compares the calculated material property value of the inspected object with the inspection set value inputted from the inspection set value input unit, and determines the quality of the inspected object.

2. The material property inspection apparatus according to claim 1, wherein
a light chopper that modulates the light irradiated to the inspected object with a constant cycle is further provided, and
the signal detection unit performs synchronous detection in a lock-in amplifier system using a reference signal synchronized with a modulated light modulated by the light chopper.

3. The material property inspection apparatus according to claim 2, wherein
a determination range for determination of the quality of the inspected object is set automatically, from the inspection set value and a statistical data obtained at the time of calculating the relation equation.

4. The material property inspection apparatus according to claim 3, wherein
the material property value is linear data, and the light intensity is logarithmic data.

5. The material property inspection apparatus according to claim 2, wherein
the material property value input unit selects one material property from a plurality of material properties, and inputs a known material property value of the test piece with respect to the selected material property.

6. The material property inspection apparatus according to claim 5, wherein
the material property value is linear data, and the light intensity is logarithmic data.

7. The material property inspection apparatus according to claim 2, wherein
the material property value is linear data, and the light intensity is logarithmic data.

8. The material property inspection apparatus according to claim 2, wherein
the material property is component content, density, tableting pressure, or porosity.

9. The material property inspection apparatus according to claim 1, wherein
a determination range for determination of the quality of the inspected object is set automatically, from the inspection set value and a statistical data obtained at the time of calculating the relation equation.

10. The material property inspection apparatus according to claim 9, wherein
the material property value input unit selects one material property from a plurality of material properties, and inputs a known material property value of the test piece with respect to the selected material property.

11. The material property inspection apparatus according to claim 10, wherein
the material property value is linear data, and the light intensity is logarithmic data.

12. The material property inspection apparatus according to claim 9, wherein
the material property value is linear data, and the light intensity is logarithmic data.

13. The material property inspection apparatus according to claim 9, wherein
the material property is component content, density, tableting pressure, or porosity.

14. The material property inspection apparatus according to claim 1, wherein
the material property value input unit selects one material property from a plurality of material properties, and inputs a known material property value of the test piece with respect to the selected material property.

15. The material property inspection apparatus according to claim 14, wherein
the material property value is linear data, and the light intensity is logarithmic data.

16. The material property inspection apparatus according to claim 14, wherein
the material property is component content, density, tableting pressure, or porosity.

17. The material property inspection apparatus according to claim 1, wherein
the material property value is linear data, and the light intensity is logarithmic data.

18. The material property inspection apparatus according to claim 17, wherein
the material property is component content, density, tableting pressure, or porosity.

19. The material property inspection apparatus according to claim 1, wherein the material property is component content, density, tableting pressure, or porosity.

* * * * *